(12) United States Patent
Foster et al.

(10) Patent No.: US 8,074,505 B2
(45) Date of Patent: Dec. 13, 2011

(54) INTERNAL COMBUSTION ENGINE EXHAUST FILTRATION ANALYSIS SYSTEM

(75) Inventors: David E. Foster, Middleton, WI (US); Ekathai Wirojsakunchai, Madison, WI (US); Christopher P. Kolodziej, Stevens Point, WI (US); Renato A. Yapaulo, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 558 days.

(21) Appl. No.: 12/169,819

(22) Filed: Jul. 9, 2008

(65) Prior Publication Data

US 2010/0005782 A1    Jan. 14, 2010

(51) Int. Cl.
*G01M 15/04*    (2006.01)
(52) U.S. Cl. .................................. 73/114.69; 73/114.71
(58) Field of Classification Search ............... 73/114.69, 73/114.71
See application file for complete search history.

(56) References Cited

U.S. PATENT DOCUMENTS

| | | | |
|---|---|---|---|
| 3,973,848 A * | 8/1976 | Jowett et al. | 356/51 |
| 5,110,747 A * | 5/1992 | Pataschnick et al. | 436/133 |
| 5,138,163 A * | 8/1992 | Butler et al. | 250/339.08 |
| 5,546,788 A * | 8/1996 | Dickow | 73/28.01 |
| 5,621,166 A * | 4/1997 | Butler | 73/114.71 |
| 6,112,575 A * | 9/2000 | Cocconi | 73/23.31 |
| 6,387,706 B1 * | 5/2002 | Eden | 436/127 |
| 6,623,975 B1 * | 9/2003 | Tefft et al. | 436/137 |
| 7,281,440 B2 * | 10/2007 | Graze et al. | 73/863.02 |
| 7,434,449 B2 * | 10/2008 | Kusaka et al. | 73/23.31 |
| 7,565,846 B2 * | 7/2009 | Silvis et al. | 73/863.03 |

OTHER PUBLICATIONS

Particulates Studies for Engines and Aftertreatment PowerPoint Presentation presented on Feb. 22, 2007.

* cited by examiner

*Primary Examiner* — Freddie Kirkland, III
(74) *Attorney, Agent, or Firm* — Boyle Fredrickson, S.C.

(57) ABSTRACT

A system for analyzing a substrate material for a diesel or other internal combustion engine exhaust filtration performance includes a valve that actuates within an exhaust system to modulate engine exhaust back pressure and correspondingly maintain a desired filtration velocity to influence a variable parameter within the system, based at least in part on an exhaust characteristic such as a sensed exhaust pressure differential defined across a substrate material.

32 Claims, 3 Drawing Sheets

INTERNAL COMBUSTION ENGINE EXHAUST FILTRATION ANALYSIS SYSTEM

STATEMENT REGARDING FEDERALLY SPONSORED RESEARCH OR DEVELOPMENT

This invention was made with United States government support awarded by the following agency: DOE DE-AC05-00OR22725. The United States government has certain rights in this invention.

CROSS REFERENCE TO RELATED APPLICATION

Not applicable

BACKGROUND OF THE INVENTION

The present invention relates to systems for testing and analyzing performance of exhaust treatment devices such as exhaust particulate filters by, for example, testing and analyzing substrate materials that may be used as filtering media in exhaust particulate filters or other exhaust treatment devices.

With the increasing awareness of environmental consequences of emitting atmospheric pollutants, and the corresponding tightening of atmospheric emission regulations, exhaust treatment devices are growing increasingly necessary. Exhaust treatment devices that reduce the volume of particulate matter and/or other non-desired emissions are well known and widely implemented for certain sources of atmospheric pollutants. Some examples are wet scrubbers and various particulate filters that are typically incorporated into industrial plant exhaust systems. These systems are largely or wholly absent from many commercial or retail buildings and establishments. This trend will likely change, whereby many smaller buildings such as, for example, charcoal grill using restaurants, may eventually be required to incorporate particulate filtration systems or other exhaust treatment devices into their respective exhaust systems.

Yet other technologies, particularly those concerning internal combustion (IC) engines, are or will also be impacted by the increasing awareness of atmospheric emissions ramifications and tightening of regulations governing such emissions. For example, IC engine exhaust after-treatment technology is rapidly evolving in response to such regulations. Eventually most or all on-road vehicles, as well as off-highway vehicles or equipment, standalone IC driven devices, for example, generators, pumps, compressors, and/or others, may require exhaust after-treatment devices to reduce the volume of non-desired emissions.

Numerous regulations have already been proposed and implemented to govern emissions of compression ignition or diesel engines. In response, diesel exhaust after-treatment devices, particularly various wall flow filtration devices such as diesel particulate filters (DPFs), are growing increasingly necessary. Many extensive experimental and computational works have been conducted in the past twenty years on wall flow filtration devices, including studies of full-scale and mini-DPFs (small wall-flow monoliths or wafer disks) to gain a more fundamental understanding of DPF filtration and regeneration performance, as well as wall flow filtration device performance generally.

Full scale studies of wall flow filtration devices, such as DPFs, tend to have at least some limitations. For example, simultaneous or sequential variations in the stages of filtration at different locations within the wall flow filtration devices are difficult to discern and account for. In other words, sequencing the filtration processes and understanding the different portions of wall flow filtration devices, as they transitions between being clean, wall-loaded, or cake-layered with soot or other particulates, at any instant during use is difficult.

Furthermore, specifically regarding DPFs that are configured to thermally regenerate, during a regeneration cycle, thermal gradients tend to be established across different portions of the DPFs. Still regarding thermally regenerating DPF wall flow filtration devices, the sequence of particulate oxidation within the filter during regeneration affects the cake, and wall filled sections of the filter differently. In light of these non-uniform conditions within DPFs, and the differences between cake and wall particulate regeneration, during full-scale analyses, reaching accurate conclusions relating to performance of particular substrate materials used as filtering media within DPFs or other wall flow filtration devices can be rather difficult.

Regarding the mini-DPFs, studies using them have primarily focused on extracting kinetic parameters for modeling the regeneration process, gaining a better understanding of reaction phenomena during the regeneration process, or determining collected soot microstructural properties. Previously, a stand-alone device was developed to simultaneously analyze multiple mini-DPFs using various tests, for example, cold flow tests and filing and regeneration experiments. Substrate material chemical and physical properties were evaluated by comparing results of such mini-DPF studies with those of full-scale DPF experiments that were studied under realistic exhaust conditions.

Despite best efforts, however, such mini-DPF studies and other wall flow filtration device studies lacked precise control and manipulation of critical parameters that tend to vary over time and which materially affect filtration performance of the substrate materials. That is, they do not correctly replicate the actual in-use processes occurring during the filling and regeneration of wall flow filtration devices such as particulate filters. This rendered it difficult to accurately compare performance characteristics of different substrate materials or investigate filtration behavior at different filling stages of the substrate materials.

SUMMARY OF THE INVENTION

The present invention provides an improved method and system that replicates the processes occurring within the filtration systems during operation, making it beneficial for analyzing filtration performance of substrate materials that are used as filtering media in DPFs, as well as performance of substrate materials of various other wall flow or other filtration devices. In one embodiment, use conditions and operational variables that may influence DPF performance, even in a mini-DPF implementation, are tightly controlled or reduced in number so that substrate materials may be better compared and accurately analyzed and intensely investigated for filtration behavior and performance. This may be done through a variety of particulate matter loaded stages of the substrate material, for example, wall loading only (barely soot cake) as well as through the spectrum of different particulate matter loadings within the soot cake stage.

In a further embodiment, filtration velocities through the substrate material(s) may be manipulated while maintaining constant engine operating conditions while also maintaining the same upstream flow conditions that a real filtration system would experience during actual use. In so doing, the technique of the present invention allows tight control of various operational conditions and variables or system parameters by providing variable exhaust flow restriction with an actuatable valve positioned in an exhaust system. This enables evaluation of filter material, e.g., substrate, performance while replicating the actual in-use operating conditions of the filtration system. The actuatable valve may be used to modulate engine exhaust back pressure which correspondingly replicates the actual flow characteristics of in-use applications of the filtration systems. In addition, the filtration velocity may be varied in response to sensed pressure differentials across the substrate material. In this configuration, exhaust gas samples that have substantially constant mass flow rate values and dilution ratios may be continuously delivered to exhaust analyzing devices or equipment.

Specifically then, the present invention provides a method of analyzing a substrate material for diesel, and other exhaust filtration, including sampling exhaust from an exhaust system of a diesel, or other type engine, and directing the sample through a substrate material held in a temperature controlled filter holder. The exhaust system includes an actuatable valve for influencing engine exhaust back pressure of a diesel engine, and the back pressure is modulated based on at least one characteristic of the exhaust flowing through the substrate material.

Thus, it is an object of at least one embodiment of the invention to provide a system for analyzing substrate materials that can modulate engine back pressure to mitigate deviations from desired flow characteristic values within the system. By mitigating such deviations, the number of uncontrolled operational variables is reduced, while still allowing the filtration device to be evaluated under conditions that accurately reproduce those of actual use.

In a further embodiment, engine exhaust back pressure is modulated to mitigate deviation from a target flow rate downstream of, optionally through, a temperature controlled filter holder. For example, the back pressure may be modulated in response to a changing pressure value, rate of change of a pressure value, or pressure differential defined across the substrate material. In this regard, a differential pressure sensor may be provided for sensing pressure differentials across the substrate material or filter housing. The differential pressure sensor cooperates with an actuator that moves the valve within the exhaust system, modulating the engine back pressure in response to pressure differentials across the substrate material or filter housing.

It is thus an object of at least one embodiment of the invention to provide for modulating engine exhaust back pressure in response to sensed pressure differentials across a substrate material or filter housing, for ensuring that exhaust exiting a filter housing has a constant flow rate, and has experienced the same flow history as would occur with in-use application. By ensuring a constant flow rate of the exhaust exiting the filter housing, exhaust sample(s) that are analyzed downstream may be interpreted relative to actual in-use conditions, with respect to variable parameters.

In a yet further embodiment, the sampled exhaust is diluted upstream of an exhaust analyzing device. An orifice is provided downstream of the exhaust analyzing device and at least partially establishes a target system flow rate. This target flow rate is maintained by varying a filtration velocity defined by the exhaust flowing through the substrate material, and addition of dilution air, controlled through via a mass flow controller or similar metering device, which may be done without changing the operating conditions of the device supplying the exhaust stream. For example, filtration velocity may be modified while maintaining constant engine operational conditions.

It is thus another object of at least one embodiment to vary filtration velocity independently from diesel engine operating conditions. By varying filtration velocity independently from engine operating conditions, the ability to evaluate different operational conditions on filtration substrate materials is facilitated.

The sampled exhaust may be diluted downstream of the filter housing and a dilution airflow rate may be held generally constant while maintaining a target system flow rate. By maintaining a target system flow rate and diluting sampled exhaust with a dilution airflow that flows at a constant rate, a ratio of respective volumes of undiluted exhaust versus diluting air may be maintained at a constant value over time.

It is thus an object of at least one embodiment of the invention to provide for maintaining a target system flow rate while diluting sampled exhaust using a dilution airflow having a constant airflow rate. By using a dilution airflow rate that is constant and providing a constant ratio of volumes of undiluted exhaust versus diluting air, the number of dynamically changing operational parameters within the system may be reduced, and evaluation of filtration performance is facilitated.

The invention may permit the sampled exhaust to cool to a predetermined temperature, and then maintain such temperature while it flows through portions of the system and is analyzed. Such cooling process may be done in multiple stages or steps. For example, while flowing from the sampling location in the exhaust system to the filter holder, the exhaust temperature may decrease by about 85 degrees C. or by about one-third in magnitude. Furthermore, while flowing from the filter holder to an exhaust analyzing device, the exhaust temperature may decrease by about 75 degrees C. or by about three-fifths in magnitude. This allows for controllable thermal environments of the sampled exhaust while still conforming to the requirement of maintaining a specified sample temperature at a final point of measurement.

It is thus an object of at least one embodiment of the invention to provide for controlled cooling of the sampled exhaust to a predetermined temperature and maintaining that temperature while the sampled exhaust flows through the system. By cooling the sampled exhaust in a controlled manner and maintaining it at a predetermined temperature, temperature related characteristics of the exhaust will be consistent over time, which is critical for measurement accuracy and validity.

The invention may also provide for modulating engine back pressure to reduce variations in a flow rate of sampled exhaust exiting the filter holder, while reproducing the actual fluid mechanic driving potential(s) that exist in in-use applications of the filtration system.

Thus, it is an object of at least one embodiment of the invention to provide a constant flow rate of exhaust exiting a filter holder, while maintaining realistic in-use flow conditions. By providing a constant flow rate of exhaust exiting a filter holder, the exhaust may be diluted consistently for downstream analysis.

These particular objects and advantages may apply to only some embodiments falling within the claims and thus do not define the scope of the invention.

DETAILED DESCRIPTION OF THE PREFERRED EMBODIMENT

Figure 1:
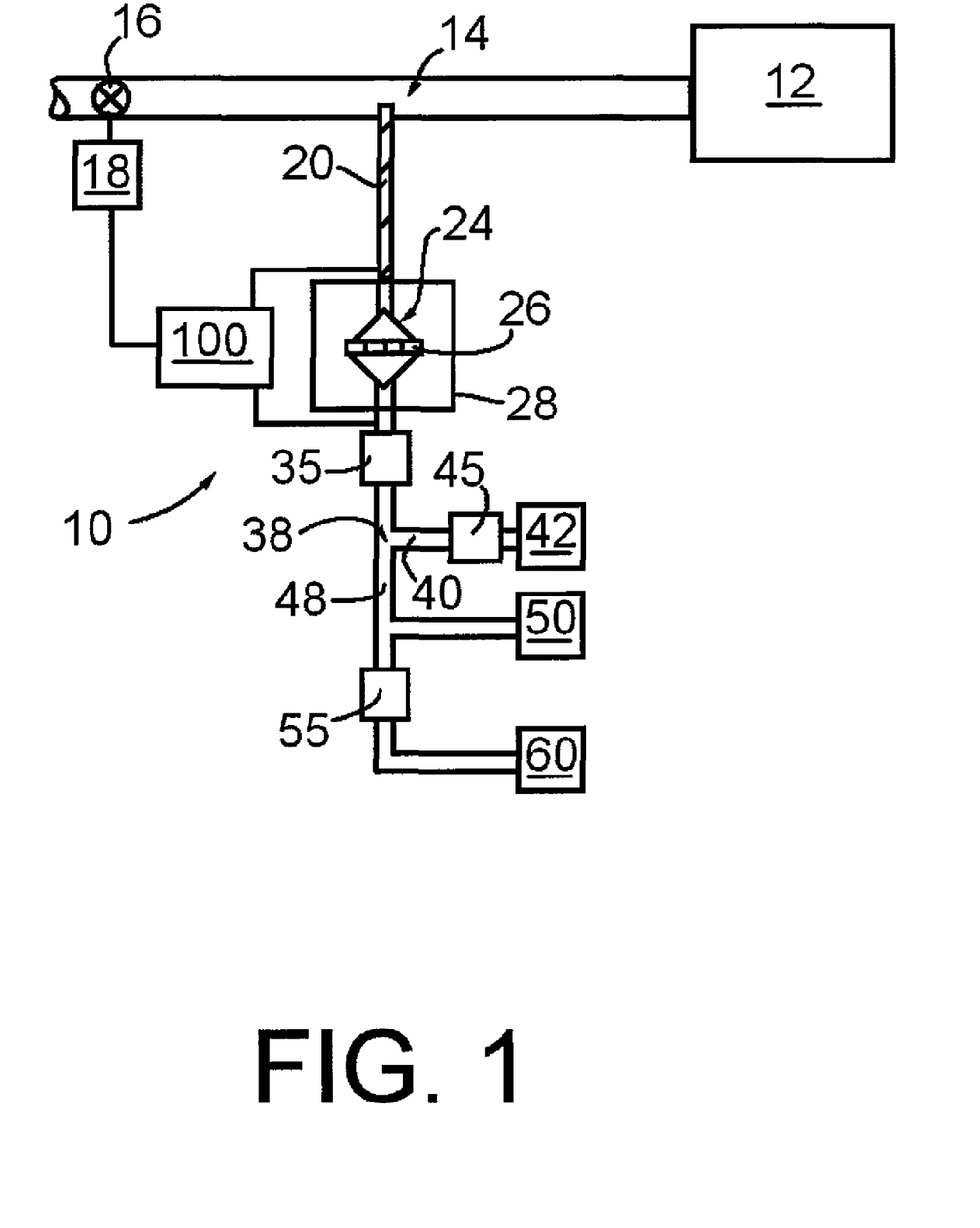
FIG. 1 is a schematic representation of a system for analyzing a substrate material for diesel exhaust filtration or regeneration performance.

Referring now to FIG. 1, the present invention provides a system 10 for analyzing wall flow filtration device performance, diesel exhaust filtration or regeneration performance of substrate materials. Although the system 10 is occasionally described herein with more specificity in terms of compression ignition engine or diesel engine exhaust filtration performance, it is fully appreciated that it may be incorporated into other filtration performance evaluation systems while remaining well within the scope of the invention. Such other systems 10 include, for example, those which evaluate filtration performance of filtering media or substrate materials used in wall flow or other filtration devices that are used as exhaust treatment devices on yet other internal combustion engines, including gasoline, propane, or other spark ignition engines, optionally other combustion exhaust generating systems.

System 10 as illustrated employs a diesel or other internal combustion engine, or other combustion exhaust generation system, referred to herein as engine 12, that is operated to produce exhaust. For implementations that include an internal combustion engine, an engine exhaust system 14, which may be made from tubing or other conduit-type structure, directs the produced exhaust out of and away from engine 12. It is appreciated that for non-engine, or other combustion exhaust generation system, implementations, the exhaust system 14 embodies other suitable structures that are configured to direct the produced combustion exhaust away from the combustion source.

Valve 16 is housed within the engine exhaust system 14 and can be, for example, a pivoting butterfly valve, a gate, or globe valve, a baffle, or damper-type device capable of variably restricting exhaust flow through engine exhaust system 14. Namely, an actuator 18 is attached to valve 16 and selectively pivots, or constricts, the valve 16 within engine exhaust system 14, correspondingly changing an effective opening dimension of engine exhaust system 14. Since engine exhaust back pressure is a function of exhaust flow characteristics, actuating valve 16 within and varying the effective opening dimensions of engine exhaust system 14 not only changes the flow characteristics of exhaust flowing therethrough, but also varies an engine exhaust back pressure value. This replicates what happens in actual operation when a filter is placed in an exhaust stream and progressively fills with particulate matter.

Still referring to FIG. 1, probe 20 may be a perforated stainless steel sampling probe that extends into the engine exhaust system 14, upstream of valve 16 and actuator 18. Exhaust is, preferably, isothermally sampled by probe 20. However, it is noted that other suitable sampling techniques may be used, so long as they do not unduly compromise the system 10's ability to replicate actual flow conditions that occur when, e.g., the internal combustion engine of a vehicle or other end-use device is in actual use.

The sample traverses probe 20 and is directed through a length of tubing to a stainless steel filter holder 24, housing a substrate material 26. Preferably, the substrate material 26 extends perpendicular with respect to flow direction through filter holder 24, ensuring that the exhaust will flow through the entire thickness of the substrate material 26 before exiting the filter holder 24. Substrate material 26 may be a small wall-flow monolith or wafer disk of various configuration(s), such as, for example, bare, washcoat, catalyzed washcoat, or other filtration material such as fibrous beds, or sintered metal structures, depending on which material is being analyzed for filtration or regeneration performance, which may be representative of a filtering medium within a diesel particulate filter.

Filter holder 24 and thus substrate material 26 are housed in an oven 28 that controls the temperature of the filter holder 24, and filter material, e.g., substrate material 26, held within. The oven 28 is used to maintain the substrate material 26 and filter holder 24 at a temperature representative of that at which an actual filtration system would encounter during real in-use situations. The temperature within oven 28 can be varied and maintained at temperatures up to 400 degrees C. Additional capacity may be added to the oven 28 to reach temperature in excess of 650° C. to facilitate filter regeneration. Notwithstanding, for some analyses, the temperature within oven 28 can be maintained at, for example, about 175 degrees C. This may be about 85 degrees C. cooler than a temperature within engine exhaust system 14, whereby the exhaust is allowed to cool by about the same amount as it flows through probe 20 and filter holder 24.

Still referring to FIG. 1, outputs of filter holder 24 and oven 28 are connected to a temperature control device 35 that can vary its internal temperature, although for some uses of system 10, its internal temperature may be maintained at about 100 degrees C. Accordingly, the exhaust may cool yet further in this second cooling phase, for example, to about 100 degrees C., while flowing through the temperature control device 35.

A dilution segment 38 of system 10 extends between and connects the temperature control device 35 with a diluting air line 40. The diluting air line 40 is connected to a dilution air source 42 that can include a mass flow controller and regulator, and can provide dried and filtered air for diluting the filtered exhaust. A second temperature control device 45 may extend between the diluting air line 40 and the dilution air source 42. Like temperature control device 35, temperature control device 45 can vary its internal temperature and in some implementations maintains an internal temperature of about 100 degrees C. In this regard, the two distinct airflows that meet and mix with each other in a dilution segment 38, i.e., the filtered exhaust and the diluting air, may have the same temperatures during the dilution process.

Referring still to FIG. 1, dilution segment 38 is connected to a length of tubing, for example diluted exhaust tubing 48, which directs the diluted exhaust further through system 10. Some of the diluted exhaust which flows through the diluted exhaust tubing 48 flows to one or more analysis devices 50. Analysis devices 50 may include, for example, any of a variety of particulate matter measuring devices such as a scanning mobility particle sizer, an engine exhaust particle sizer, and a Fourier transform infrared spectrometer, or other combustion gases analysis systems including, for example, flame ionization detectors, non-disperse infrared analyzers, paramagnet O2 sensors, chemiluminescent nitrogen oxide analyzers, and/or others, depending on the desired measurements, procedures, or analyses that will be performed using system 10.

The remaining volume of diluted exhaust, that which did not flow to the analysis devices 50, flows through the entire length of the diluted exhaust tubing 48. At some point in the traverse through diluted exhaust tubing 48, the unanalyzed diluted exhaust flows through an orifice 55 that is provided within the diluted exhaust tubing 48. The size of the opening in orifice 55 influences flow rate of the diluted exhaust. In some implementations, orifice 55 includes corresponding components to enhance its performance, such as a cooperating vacuum pump or other suction device. Thus, orifice 55, alone and/or in conjunction with the vacuum pump or other suction device, may be used to at least partially establish or define a target mass flow rate through at least a portion of system 10 which may facilitate ensuring, for example, a constant flow rate to the analysis devices 50.

Various devices and accessories may be provided downstream of the orifice 55, such as building exhaust accessories 60. The building exhaust accessories may include a mass flow meter, a regulator, an additional vacuum pump or suction device extending between and connecting the orifice 55 to a building exhaust system that ultimately vents the diluted exhaust into the air.

Referring still to FIG. 1, like orifice 55, valve controls 100 may influence flow rates through the system 10. However, unlike many implementations of orifice 55, valve controls 100 may dynamically adjust or vary one or more of a variety of flow rates or other variable parameters within system 10. Such variable parameters tend to be related to or functions of each other, and may include, for example, (i) the pressure upstream of the filter holder 24 or substrate material 26, (ii) a raw exhaust flow rate defined through valve 16, (iii) a sampled exhaust flow rate defined through probe 20, (iv) a filtration velocity defined through substrate material 26, (v) a filtered undiluted exhaust flow rate defined through temperature control device 35, (vi) a dilution airflow rate define through diluting air line 40, (vii) a dilution ratio defined as a ratio of a volume of filtered exhaust versus a volume of diluting air, and (viii) a diluted exhaust flow rate defined through the diluted exhaust tubing 48, upstream of the analysis devices 50.

Still referring to FIG. 1, valve controls 100 may include one or more sensors such as pressure sensors, differential pressure sensors, mass airflow sensors, inclined manometers, thermocouples or other temperature measurement devices, and a controller such as a proportional-integral-derivative (PID) controller, proportional-integral (PI) controller, proportional-derivative (PD) controller, or other controller. To influence and adjust one of the above-listed variable parameters, the valve controls 100 cooperate with valve 16, actuator 18, and filter holder 24, substrate material 26, oven 28, by controlling or sensing various characteristics of such components. Namely, valve controls 100 may sense operating conditions, for example an exhaust characteristic, within the system 10 and actuate valve 16 to adjust one of the variable parameters in system 10 in a desired manner.

Figure 2:
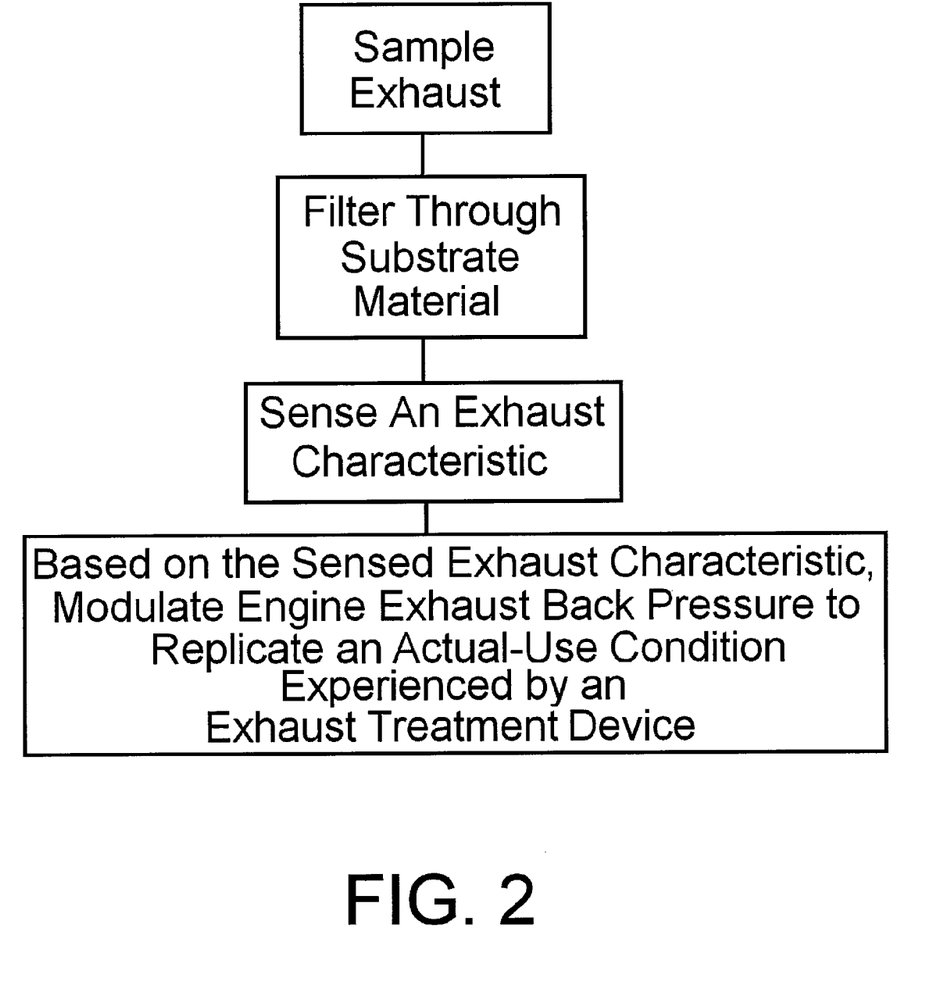
FIG. 2 is a flowchart of a back pressure modulating program that may work with the present invention to control variable parameters.
Figure 3:
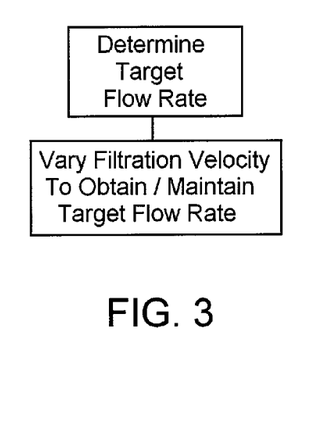
FIG. 3 is a flowchart of a filtration velocity varying program that may work with the present invention to control variable parameters.
Figure 4:
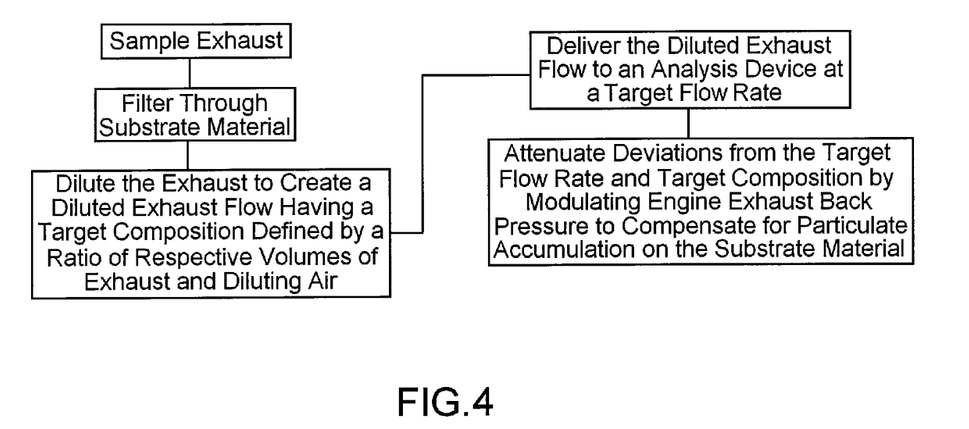
FIG. 4 is a flowchart similar to that of FIG. 2 showing maintaining a target flow rate by modulating engine back pressure.

Referring to FIGS. 2-4, they depict various techniques that may be used while analyzing filtration or regeneration performance of substrate material 26. This can be accomplished using valve controls 100 to precisely control any of the variable parameters, directly or indirectly, by adjusting valve 16. The exemplary procedures of FIGS. 2-4 may be used as standalone techniques or partially or wholly combined with each other. Furthermore, yet other suitable procedures and techniques may be implemented depending on the desired measurements and analyses that system 10 will perform.

Preferably, the procedures used by system 10 allow valve controls 100 to cooperate with other components of the system 10 and define a feedback system which automatically replicates actual-use conditions that are experienced by an exhaust treatment device during a typical use life. For example, in an in situ or actual-use application, when an exhaust treatment device fills or clogs, it requires a larger pressure drop to accomplish the same mass flow rate as compared to its previous clean or unclogged mass flow rate values. Since an engine is, in effect, a positive displacement device, an actual-use exhaust treatment device represents a progressively increasing constriction in the exhaust system as it fills. Consequently, engine exhaust back pressure increases, which in turn drives the same mass flow rate of exhaust through the exhaust treatment device. Correspondingly, an exit side of the exhaust treatment device stays at approximately the same pressure throughout this entire process despite the increasing pressure values that are realized upstream of the exhaust treatment device while it fills or clogs. This actual-use flow characteristic can be accurately replicated by system 10.

Stated another way, typically in actual-use internal combustion engine applications, when engine operating conditions remain constant, mass flow rates through an exhaust treatment device likewise remain constant despite increasing flow restrictions presented by the filling or clogging exhaust treatment device. This is because engine exhaust back pressure exists as a function of exhaust treatment device flow capacitance, whereby when flow is increasingly restricted, engine exhaust back pressure increases accordingly. The increasing engine exhaust back pressure correspondingly increases the pneumatic driving force that pushes the exhaust through the exhaust treatment device, whereby the mass flow rate through the exhaust treatment device remains substantially constant during an entire process of exhaust treatment device wall filling or clogging. Here again, this tendency may be accurately replicated by system 10, whereby a mass flow rate through substrate material 26 can be maintained at a constant rate by increasing engine exhaust back pressure using valve 16, without requiring an ancillary driving force such as pulling a progressively increasing vacuum pressure downstream of the substrate material 26.

Still referring generally to FIGS. 1-4, valve controls 100 may precisely control any of the variable parameters by actuating valve 16 to correspondingly modulate engine exhaust back pressure, which in turn influences downstream operating conditions within system 10, for example in an effort to replicate actual-use conditions that exhaust treatment devices experience. During operation of system 10, the valve controls 100 operate or adjust the valve 16 in the engine exhaust system 14, which in turn changes the backpressure on the engine 12 and in the exhaust stream itself. Since the back pressure in the exhaust stream drives the exhaust flow through the substrate material 26, by actuating the valve 16, valve controls 100 can precisely control numerous variable parameters or conditions to maintain constant values for desired durations of time, optionally accurately changing such values over time as desired.

Referring now specifically to FIGS. 1 and 2, one suitable technique for using system 10 may include sampling engine exhaust through probe 20 and directing it through filter holder 24 and thus also through substrate material 26, corresponding to the procedures set forth in the top two boxes in FIG. 2. If substrate material 26 is clean, not yet used as a filtering medium, at this time baseline performance values may be determined for substrate material 26. Certain baseline performance values relating to pressure within filter holder 24 may be determined using an inclined manometer in lieu of, for example, a differential pressure sensor. The manometer may be used in favor over a differential pressure sensor for such baseline value determinations because only nominal pressure differential values may be exhibited across a clean substrate material 26. These baseline performance values may be used later in various comparative analyses along with performance values observed during extended use periods of system 10.

Still referring to FIGS. 1 and 2, during extended use periods of system 10, dynamic changes or variations in flow rates or dilution ratios may occur over time since the substrate material 26 collects soot and other particulates on its surface. As soot and other particulates collect and cake on substrate material 26, the particulates accumulate within its pores, compromising the ability of the substrate material 26 to flow exhaust therethrough. This may influence flow rates down stream of the substrate material 26 and the dilution ratio of the diluted exhaust flowing through diluted exhaust tubing 48 since, intuitively, as more soot and particulates accumulate on or in substrate material 26, exhaust is less able to freely flow through the substrate material 26. Accordingly, for implementations requiring non-varying flow rates and dilution ratios to be provided to analysis devices 50, the valve controls 100 may be configured or programmed to attenuate such dynamic changes in flow rates and dilution ratios within system 10.

Still referring to FIGS. 1 and 2, and particularly to the procedures of the lower two boxes of FIG. 2, valve controls 100 may sense certain exhaust characteristics and then correspondingly modulate engine exhaust back pressure in order to attenuate dynamic changes in flow rates and dilution ratios within system 10, ensuring that non-varying flow rates and dilution ratios are provided to analysis devices 50. In other words, based on the sensed exhaust characteristic, valve controls 100 can automatically modulate engine exhaust back pressure to replicate an actual-use condition experienced by an exhaust treatment device, for example, maintaining a constant mass flow rate and pressure downstream of the substrate material 26.

As one example of a suitable exhaust characteristic, valve controls 100 may sense or detect an exhaust characteristic defined by one or more operating conditions within filter holder 24. This may be a pressure differential defined between the unfiltered exhaust and the filtered exhaust within the filter holder 24, on opposing sides of the substrate material 26. A differential pressure sensor within valve controls 100 may sense changing values of the pressure differential across the substrate material 26. Valve controls 100 may react by modulating engine exhaust back pressure to mitigate downstream effects of the changing pressure differential values, ensuring that non-varying flow rates and dilution ratios are provided to analysis devices 50.

For example, increasing pressure differentials may indicate decreasing flow rates of undiluted exhaust and overly diluted exhaust being presented to analysis devices 50. Accordingly, if the pressure differential value is increasing, then the valve controls 100 may close valve 16, increasing engine exhaust back pressure and thus increasing the pneumatic driving force that pushes the exhaust through substrate material 26. This will maintain the same mass flow rate through the filter material, mitigating effects of their falling values while seeking the desire values.

Still referring to FIGS. 1 and 2, some analyses and measurements may not require constant flow rates or dilution ratio values to be presented to analysis devices 50. Rather, some require the ability to adjust and tune ones of the variable conditions within system 10. For these implementations, valve controls 100 may modulate engine exhaust back pressure as needed to obtain the desired values or rates of changes in values of the variable conditions within system 10. Stated another way, valve controls 100 may ensure that certain variable parameters or conditions are varied within predetermined acceptable rates of change while the analysis devices 50 measure or analyze the diluted exhaust.

Accordingly, although it might not be truly representative of an exhaust treatment device actual-use characteristic, if it is desired to provide a diluted exhaust flow at a constant flow rate to the analysis devices 50 while permitting filtration velocity to decrease as a function of substrate material 26 particulate accumulation, then the engine exhaust back pressure can be maintained at a constant value, whereby the filtration velocity will decrease as the substrate material 26 accumulates particulate matter. At the same time, the mass flow controller of the dilution air source 42 and the orifice 55 may be use to ensure or maintain a constant flow rate to the analysis devices 50. More fundamentally, by using the mass flow controller of the dilution air source 42 to vary the volume of introduced diluting air, and the orifice 55, the flow rate through the substrate material 26 may be varied as desired while maintaining constant engine operating conditions which can be useful when replicating actual-use flow conditions.

FIG. 3 expresses procedures which may be largely analogous to those of FIG. 2, whereby they can be used to achieve substantially similar results of precisely adjusting, tuning, and controlling, variable parameters or characteristics of system 10 by utilizing valve controls 100.

Referring now to FIGS. 1 and 3, a target flow rate may be determined and at least partially established by selecting a size of orifice 55 to correspond to the target flow rate. This is generally depicted by the procedure represented by the uppermost box in FIG. 3. Then, valve controls 100 may be configured or programmed to maintain the target flow rate, optionally to change the target flow rate and then seek new target flow rate. Valve controls 100 may seek a newly established target flow rate or maintain a previously determined target flow rate by modulating engine exhaust back pressure to vary or adjust the filtration velocity in order to arrive at the desired target flow rate.

Referring still to FIGS. 1 and 3, when it is desired to maintain a target flow rate, optionally other exhaust flow condition, if the valve controls 100 sense deviations from the target flow rate, or deviation from some other value that corresponds to the target flow rate, then it may implement corrective commands to attenuate the magnitude of such flow rate deviations. As one example, valve controls 100 may estimate an actual flow rate as a function of a pressure differential across the filter holder 24, largely analogous to various procedures described above with respect to FIG. 2. In a scenario where the pressure differential increases across filter holder 24, valve controls 100 may interpret that the undiluted exhaust flow rate through system 10 is decreasing deviating from a target undiluted exhaust flow rate, and may increase the backpressure in a restorative effort. This may be done by modulating engine exhaust back pressure by actuating valve 16 in order to maintain the filtration velocity through the substrate material 26, increasing the pneumatic driving pressure to maintain the target undiluted exhaust flow rate.

Referring now to FIGS. 1 and 4, another exemplary procedure for using valve controls 100 to closely replicate actual-use conditions experienced by an exhaust treatment device during a typical use life can be seen in FIG. 4. Similar to the procedure described above with respect to FIG. 2, the procedure(s) of FIG. 4 includes sampling engine exhaust through probe 20 and directing it through filter holder 24 and thus also through substrate material 26 which filters it. Based at least partially on the particular flow requirements of the various analysis devices 50, dilution air source 42 introduces diluting air into the filtered exhaust to achieve a predetermined target composition of the diluted exhaust. The target composition of the diluted exhaust can be generally defined by a ratio of respective volumes of the filtered exhaust versus the diluting air. The diluted exhaust is then directed to one or more analysis device(s) 50 at a predetermined target flow rate which is established or greatly influenced by way of, for example, the mass flow controller of the dilution air source 42 and/or orifice 55.

Still referring to FIGS. 1 and 4, one or more of the sensors within valve controls 100 may detect, for example, deviations from the target flow rate and target composition of the diluted exhaust. Deviations from such target flow rates and target compositions could indicate filling, clogging, or particulate accumulation conditions on substrate material 26. Furthermore, depending on the particular configuration of the analysis device 50, varying flow rates and compositions of the diluted exhaust could compromise the integrity of the measurements or analyses being performed.

It is noted that the sensors within valve controls 100 are not required to sense any actual deviations from the target flow rate and target composition of the diluted exhaust, but rather valve controls 100 may conclude the same based on sensing some other flow characteristic indicative of, or otherwise corresponding to, such condition(s). In other words, depending on its particular configuration, the sensor within valve controls 100 may identify threshold values or changes in values of, for example, one or more of a pressure differential across the substrate material 26, a pressure upstream of substrate material 26, a pressure downstream of substrate material 26, a sampled exhaust flow rate through probe 20, a filtration velocity defined through substrate material 26, a mass flow rate exiting the filter holder 24, optionally mass flow rates, velocities, pressures, or pressure differentials, at or through other portions of the system 10.

Still referring to FIGS. 1 and 4, in response to identifying such deviations from the target flow rate and/or target composition of the diluted exhaust, or sensing some characteristic indicating the same, valve controls 100 take restorative or corrective action. In so doing, the valve controls 100 restore the conditions of system 10 to closely correspond to those experienced by actual-use exhaust treatment devices, preferably doing so automatically by way of suitable feedback principles.

For example, valve controls 100 modulate engine exhaust back pressure, varying it in the same manner that would occur in an actual-use exhaust treatment situation, by signaling actuator 18 to rotate valve 16 to achieve the desired engine exhaust back pressure value. Accordingly, if the mass flow rate through, or pressure on the exit side of, the substrate material 26 decreases in value, valve 16 is actuated to increase the engine exhaust back pressure. This increases the pneumatic driving force pushing the unfiltered exhaust through the substrate material 26, restoring both the mass flow rate through and pressure on the exit side of the substrate material 26 to their previous values, respectively. Modulating engine exhaust back pressure in this manner compensates for the filling, clogging, or particulate accumulation conditions of substrate material 26, replicating actual-use occurrences experienced by an exhaust treatment device. Furthermore, modulating engine exhaust back pressure in this manner attenuates any the deviations from the target flow rate and target composition of the diluted exhaust, whereby the analysis device(s) 50 is presented with diluted exhaust samples that have substantially constant compositions and flow rates. This facilitates accurate measurements and/or analyses.

It is apparent that valve controls 100 may be configured or programmed to compensate for dynamically changing variables within system 10. The valve controls 100 may modulate engine exhaust back pressure by using valve 16 to manipulate filtration velocity through the substrate material 26. System 10 allows manipulation of a variety of critical parameters affecting filtration processes, for example, manipulating filtration velocity without changing engine operating conditions. This permits analysis of the substrate material 26 as a filter medium under tightly controlled conditions, facilitating reliable performance comparisons of different substrate materials 26 having differing compositions. Furthermore, the tight controls and feedback functionality provided by valve controls 100 may allow for detailed analysis of any of a variety of filter performance characteristics that can be measured, including effects of filtration velocity on wall loading capacity of the substrate material 26, effects of different particulate matter characteristics on pressure differential, wall loading, filtration efficiency, filtration velocity and other flow velocities, as well as numerous filter regeneration performance characteristics, such as clean and loaded permeability assessments, and/or others. Correspondingly, due to the tunability of system 10 by using valve controls 100, temperature and flow complications may be minimized while allowing precise control over critical variable parameters that affect filtration performance. This technique of precisely controlling exhaust flow and other parameters within system 10 facilitates accurate particulate matter measurements and analyses downstream of the substrate material 26, which can enhance the accuracy and improve the details of obtained substrate material 26 or other filter material performance measures and/or values.

It is specifically intended that the present invention not be limited to the embodiments and illustrations contained herein and the claims should be understood to include modified forms of those embodiments including portions of the embodiments and combinations of elements of different embodiments as come within the scope of the following claims.

What we claim is:

1. A method of analyzing exhaust filtration performance of a filter substrate material for use in an exhaust filter, the method comprising the steps of:
    (a) sampling a volume of exhaust being discharged from an internal combustion engine at an exhaust pipe location;
    (b) directing the sampled volume of exhaust through a filter substrate material housed in a filter holder;
    (c) sensing a flow of the exhaust flowing through the filter substrate material;
    (d) modulating engine exhaust back pressure at the exhaust pipe location based on the sensed flow of the exhaust flowing through the filter substrate material to reduce mass flow variation of the exhaust flowing through the filter substrate; and
    (e) analyzing filtration performance of the substrate material.

2. The method of claim 1 wherein modulating engine exhaust back pressure mitigates deviation from a target mass flow rate downstream of the filter holder.

3. The method of claim 2 wherein the engine exhaust back pressure is modulated in response to a changing pressure value defined across the substrate material.

4. The method of claim 1 wherein modulating engine exhaust back pressure mitigates deviation from a target mass flow rate through the substrate material.

5. The method of claim 4 wherein the engine exhaust back pressure is modulated in response to a rate of change of a pressure value defined across the substrate material.

6. The method of claim 1 wherein a valve housed in an exhaust system of the internal combustion engine is actuated to modulate the engine exhaust back pressure.

7. The method of claim 6 wherein (i) a valve actuator for actuating the valve in the exhaust system, and (ii) a differential pressure sensor for sensing a pressure differential across the substrate material cooperate with each other to provide a generally constant exhaust flow rate downstream of the substrate material.

8. The method of claim 1 wherein the internal combustion engine is a diesel engine.

9. The method of claim 1 wherein the flow is sensed by sensing at least one of (i) a pressure differential across the filter substrate material, (ii) a pressure upstream of the filter substrate material, and (iii) a pressure downstream of the filter substrate material.

10. The method of claim 1 wherein the flow is sensed by sensing at least one of (i) a flow rate of the exhaust upstream of the filter substrate material, (ii) a velocity of the exhaust flowing through the filter substrate material, and (iii) a mass flow rate of the exhaust downstream of the filter substrate material, and wherein the analyzing filtration performance of the substrate material includes analyzing filtration performance at multiple particulate matter loaded stages of the substrate material in which different amounts of particulate matter have accumulated on the substrate material.

11. A method of analyzing exhaust filtration performance of a filter substrate material for use in an exhaust filter, the method comprising the steps of:
(a) sampling a volume of exhaust being discharged from an internal combustion engine at an exhaust pipe location;
(b) directing the sampled volume of exhaust through a filter substrate material housed in a filter holder;
(c) diluting the volume of exhaust at a location that is both (i) downstream of the filter substrate material, and (ii) upstream of an exhaust analyzing device with a known mass flow;
(d) using an orifice downstream of the exhaust analyzing device to establish a target system flow rate;
(e) maintaining the target system flow rate by varying a filtration velocity defined by the volume of exhaust flowing through the filter substrate material; and
(f) analyzing filtration performance of the substrate material.

12. The method of claim 11 wherein at step (e), the filtration velocity is varied by modulating engine exhaust back pressure.

13. The method of claim 11 wherein the filtration velocity is varied without changing an operational speed of the internal combustion engine.

14. The method of claim 13 wherein a dilution air flow rate is generally constant while maintaining the target system flow rate.

15. The method of claim 14 wherein a ratio of the volume of exhaust versus a volume of diluting air is maintained relatively constant during an exhaust analysis procedure.

16. The method of claim 11 wherein the internal combustion engine is a diesel engine.

17. The method of claim 16 wherein a temperature of the exhaust decreases by about 85 degrees C., between a sampling location in an exhaust system of the diesel engine and the filter holder.

18. The method of claim 16 wherein a temperature of the exhaust decreases by about one-third in magnitude, between a sampling location in an exhaust system of the diesel engine and the filter holder.

19. The method of claim 16 wherein a temperature of the exhaust decreases by about 75 degrees C. after exiting the filter holder and before reaching the exhaust analyzing device.

20. The method of claim 16 wherein a temperature of the exhaust decreases by about three-fifths in magnitude after exiting the filter holder and before reaching the exhaust analyzing device.

21. A method of analyzing exhaust filtration performance of a filter substrate material for use in an exhaust filter, the method comprising the steps of:
(a) sampling a volume of exhaust being discharged from an internal combustion engine;
(b) directing the sampled volume of exhaust through a filter substrate material housed in a filter holder and defining a flow rate of exhaust exiting the filter holder;
(c) modulating engine exhaust back pressure to reduce variations in the flow rate of exhaust exiting the filter holder; and
(d) analyzing filtration performance of the substrate material while the sampled volume of the exhaust is being directed through the substrate material.

22. The method of claim 21 including the step of: sensing a pressure differential established across the substrate material.

23. The method of claim 22 wherein sensing the pressure differential across the substrate material is performed between steps (b) and (c).

24. The method of claim 22 wherein the engine exhaust back pressure is modulated based at least partially on the sensed pressure differential across the substrate material.

25. The method of claim 21 wherein the internal combustion engine is a diesel engine.

26. A system for analyzing exhaust filtration performance of a filter substrate material for use in an exhaust filter, the system comprised of:
an internal combustion engine exhaust system;
a valve for variably restricting flow through the internal combustion engine exhaust system;
a probe for sampling a volume of exhaust upstream of the valve;
a filter holder fluidly coupled to the probe;
a filter substrate material housed in the filter holder such that the sampled exhaust passes therethrough, the filter substrate material being analyzed for filtration performance; and
a sensor for sensing a flow of the exhaust flowing through the filter holder, wherein the sensor and valve cooperate with each other for modulating engine exhaust back pressure based on the flow of the exhaust flowing through the filter holder.

27. The system of claim 26, wherein the sensor is a differential pressure sensor.

28. The system of claim 26, wherein the sensor is an inclined manometer.

29. The system of claim 26, further comprising a controller communicating with the valve and the sensor.

30. The system of claim 29, wherein the controller is a PID controller.

31. The system of claim 29, wherein the controller is a PD controller.

32. The system of claim 29, wherein the controller is a PI controller.

* * * * *